(12) United States Patent
Shinnaka et al.

(10) Patent No.: US 11,047,148 B2
(45) Date of Patent: Jun. 29, 2021

(54) STORAGE FACILITY FOR OBJECT OF PAYING OF RESPECTS

(71) Applicant: Daifuku Co., Ltd., Osaka (JP)

(72) Inventors: Hidenobu Shinnaka, Tokyo (JP); Kazuya Arima, Tokyo (JP)

(73) Assignee: Daifuku Co., Ltd., Osaka (JP)

( * ) Notice: Subject to any disclaimer, the term of this patent is extended or adjusted under 35 U.S.C. 154(b) by 125 days.

(21) Appl. No.: 16/223,711

(22) Filed: Dec. 18, 2018

(65) Prior Publication Data

US 2019/0194970 A1 Jun. 27, 2019

(30) Foreign Application Priority Data

Dec. 26, 2017 (JP) .............................. JP2017-249943

(51) Int. Cl.
*E04H 13/00* (2006.01)
*A47G 33/02* (2006.01)
*B65G 1/04* (2006.01)

(52) U.S. Cl.
CPC ........... *E04H 13/006* (2013.01); *A47G 33/02* (2013.01); *B65G 1/0492* (2013.01); *E04H 13/008* (2013.01); *B65G 2201/0235* (2013.01)

(58) Field of Classification Search
CPC ... E04H 13/006; E04H 13/008; B65G 1/0492; B65G 1/06
See application file for complete search history.

(56) References Cited

U.S. PATENT DOCUMENTS 4,688,359 A * 8/1987 See ...................... A61G 17/08
52/134
10,094,131 B1 * 10/2018 Garcia, III ............... G07G 3/00

FOREIGN PATENT DOCUMENTS

| CN | 203867277 U | 10/2014 |
|---|---|---|
| JP | 8128235 A | 5/1996 |
| JP | H1113314 A | 1/1999 |
| JP | 2002235459 A | 8/2002 |
| JP | 2012246753 A | 12/2012 |
| JP | 201504906 A | 11/2015 |

* cited by examiner

*Primary Examiner* — Saul Rodriguez
*Assistant Examiner* — Willie Berry, Jr.
(74) *Attorney, Agent, or Firm* — The Webb Law Firm

(57) ABSTRACT

A storage facility for objects of paying of respects includes a partition wall provided to partition off a support location from a respects-paying location, and a respects-paying window configured to allow a person visiting to pay respects to view an object of paying of respects being at the support location. Each object of paying of respects has at least one viewing surface which is a surface selectable to be viewed through the respects-paying window. A plurality of kinds of viewing surfaces are provided. The respects-paying window is provided with an altering device configured to change the size of a visually unobstructed area depending on the size of the viewing surface, of an object of paying of respects located at the support location, that is selected to be viewed, the visually unobstructed area being an area through which a person visiting to pay respects can view the object.

5 Claims, 11 Drawing Sheets

STORAGE FACILITY FOR OBJECT OF PAYING OF RESPECTS

CROSS-REFERENCE TO RELATED APPLICATION

This application claims priority to Japanese Patent Application No. 2017-249943 filed Dec. 26, 2017, the disclosure of which is hereby incorporated in its entirety by reference.

TECHNICAL FIELD

The present invention relates to a storage facility for objects of paying of respects, the storage facility comprising a plurality of storage locations each configured to store an object of paying of respects, a respects-paying area which includes an area for a person, visiting to pay respects, to pay respects in, a transport system configured to transport an object of paying of respects between the storage location and a support location provided in the respects-paying area.

BACKGROUND OF THE INVENTION

JP Publication of Application No. 2002-235459 (Patent Document 1) discloses a storage facility for object of paying of respects which comprises a storage area (A) for storing a plurality of containers (2) each for holding a housed item (1), respects-paying areas (B) each for a person (visiting to pay respects) to pay respects in, and a transport system (C) for transporting a container (2) between the storage area (A) and a support location (D) provided in each respects-paying area (B). In Patent Document 1, the container (2) and one or more housed items (1) held therein are referred to as an object of paying of respects (referred to, hereinafter, simply as an "object").

In the storage facility of Patent Document 1, when a person visits to pay respects, a desired container (2) is retrieved from the storage area (A) by the transport device (C) and is transported to the respects-paying area (B) in which the person visiting to pay respects awaits. Attached to one side surface of the container (2) is a plate (5) that shows information related to the object, such as the deceased's family name, the deceased's family crest or symbol, and the deceased's favorite words or sayings, etc. The visiting person pays respects with the view of the information shown on the plate (5) of the container (2) which is transported to the support location (D) in the respects-paying area (B). In the following in this BACKGROUND ART section, the surface (of an object) that is available for a viewing purpose for a person visiting to pay respects will be referred to as a "viewing surface". In the storage facility of Patent Document 1, one side surface of a container (2) to which the plate-shaped member (5) is attached corresponds to the "viewing surface".

Incidentally, in the storage facility of Patent Document 1, a "decorative portion 22" is provided to surround the viewing surface of a container (2) located at a support location (D). However, the storage facility of Patent Document 1 is designed for viewing surfaces having the same one size and shape defined in advance and does not contemplate the possibility of dealing with viewing surfaces of different sizes and shapes. Thus, there are instances in which the object in the respects-paying area cannot be properly presented depending on the size of the viewing surface that is selected to be viewed.

SUMMARY OF THE INVENTION

Thus, a storage facility for objects of paying of respects is desired in which an object of paying of respects can be properly presented regardless of the size of the viewing surface that is selected to be viewed.

In light of the point described above, a storage facility for objects of paying of respects comprises: a plurality of storage locations each configured to store an object of paying of respects; a respects-paying area which includes an area for a person, visiting to pay respects, to pay respects in; a transport system configured to transport an object of paying of respects between the storage location and a support location provided in the respects-paying area; a partition wall located in the respects-paying area to partition off the support location from a respects-paying location for a person visiting to pay respects, to pay respects at; and a respects-paying window provided in the partitioning wall and configured to allow a person who is visiting to pay respects and who is located at the respects-paying location to view an object of paying of respects being at the support location; wherein each object of paying of respects is provided with at least one viewing surface which is a surface selectable to be viewed through the respects-paying window, wherein a plurality of kinds of viewing surfaces are provided wherein a viewing surface of one kind being different in size from a viewing surface of another kind, and wherein the respects-paying window is provided with an altering device configured to change the size of a visually unobstructed area depending on the size of a viewing surface, of an object of paying of respects located at the support location, that is selected to be viewed, the visually unobstructed area being an area through which a person visiting to pay respects can view the object of paying of respects.

With such an arrangement, the size of the visually unobstructed area of the respects-paying window is changed depending on the size of the viewing surface (of the object of paying of respects at the support location) that is selected to be viewed. This makes it possible to keep the gap between the outer edges of the viewing surface and the outer edges of the visually unobstructed area of the respects-paying window, from becoming too large, for the size of the viewing surface that is selected to be viewed. This makes possible to properly present an object of paying of respects in the respects-paying area regardless of the size of the viewing surface that is selected to be viewed.

DESCRIPTION OF THE EMBODIMENTS

As an embodiment of a storage facility for object of paying of respects, a storage facility 100 for objects of paying of respects 1 (each of which will be referred to hereinafter simply as an "object 1") is described next with reference to the attached drawings.

Figure 1:
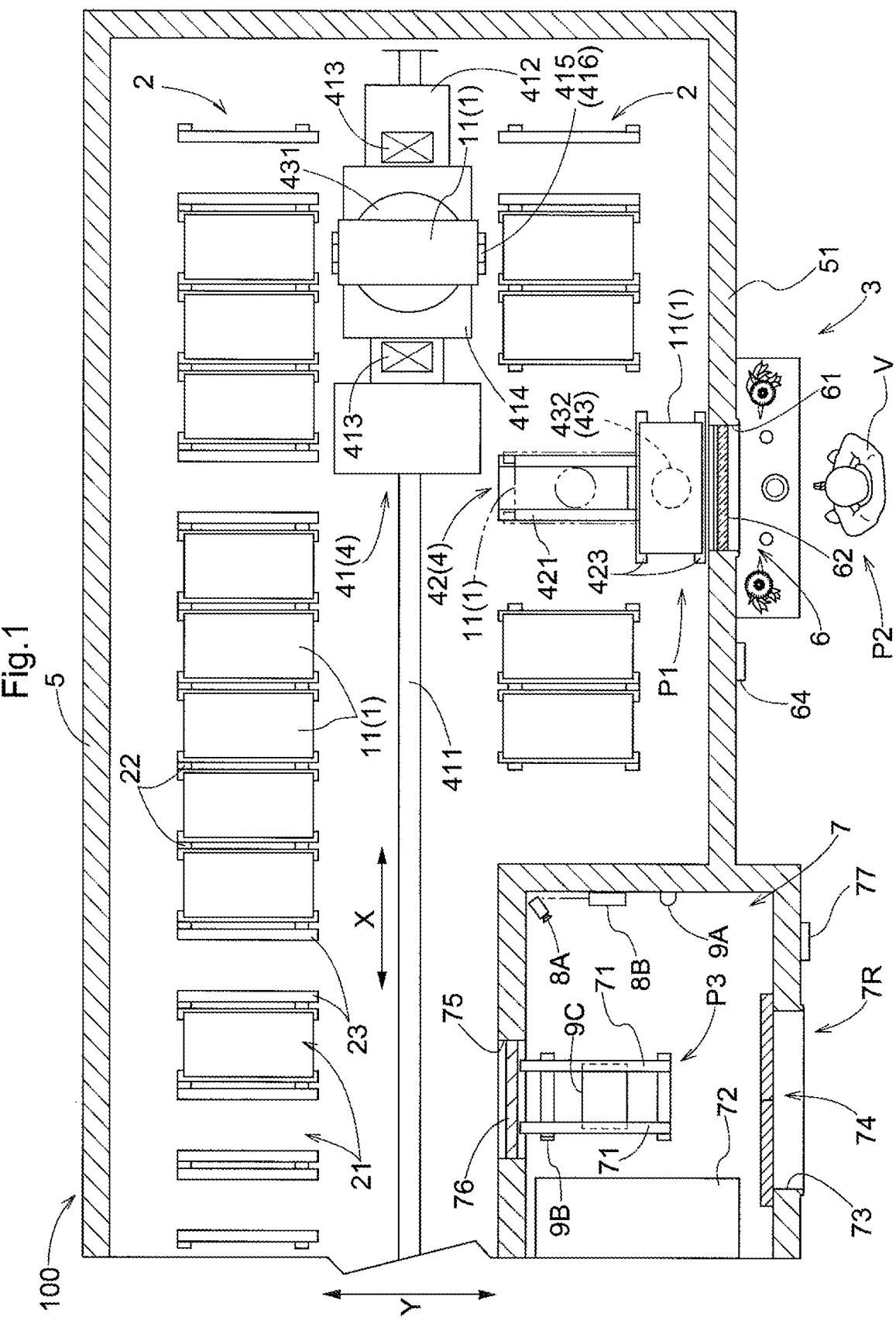
FIG. 1 is a plan view of a storage facility for objects of paying of respects in accordance with an embodiment.
Figure 2:
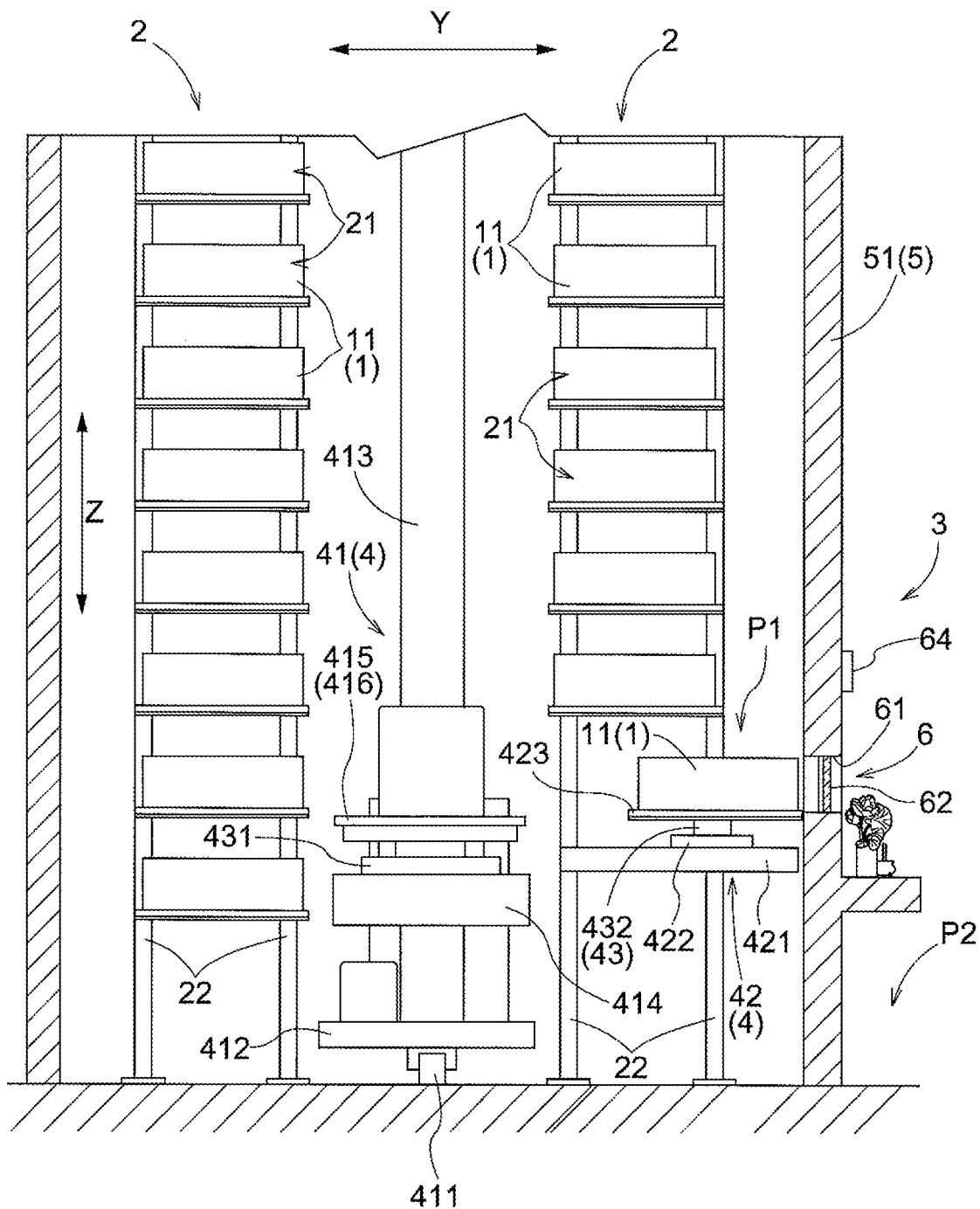
FIG. 2 is a side view of the storage facility for objects of paying of respects in accordance with the embodiment.

As shown in FIGS. 1 and 2, the storage facility 100 includes storage racks 2 each having a plurality of storage locations 21 each configured to store an object 1, a respects-paying area 3 which includes an area for a person V (visiting to pay respects) pays respects in, and a transport system 4 configured transport an object 1 between the storage location 21 and a support location P1 provided in the respects-paying area 3. Note that, as can be understood from the description below, the respects-paying area 3 also includes an area for an object of paying of respects which includes an area surrounding an object of paying of respects 1 when such object 1 is at a support location described below. Thus, the respects-paying area 3 includes an area intended for a person visiting to pay respects to be oriented toward when paying respects. As such, the respects-paying area 3 includes a respects-paying portion which includes a support location described below as well as a portion that can provide an area for a person (visiting to pay respects) to pay respects in, among other things that may be described to be provided in a respects-paying area 3.

Firstly, an object of paying of respects 1 (or simply "object 1") is described in detail.

Figure 3:
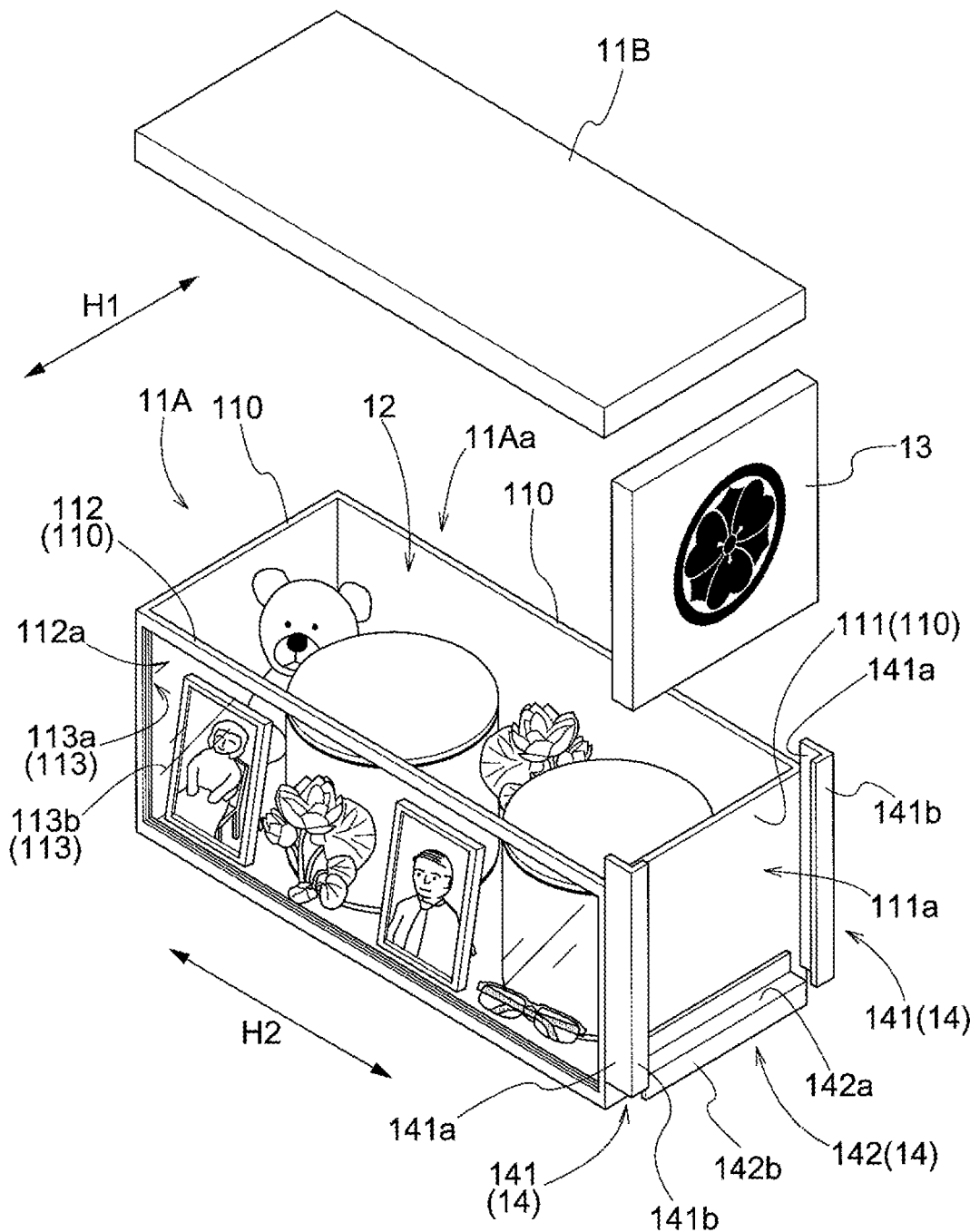
FIG. 3 is a perspective view showing an object of paying of respects.

As shown in FIG. 3, an object of paying of respects 1 comprises a container 11 and one or more items 12 held in the container 11 (each such item is sometimes referred to herein as a "housed item"). A housed item 12 may, for example, be any type of item which has something to do with the deceased, such as an item left by the deceased and a photograph of the deceased, or may be an ornamental object appropriate for a season of the year, such as artificial flowers. A housed item 12 may also be a funerary urn containing deceased's cremated remains.

Each container 11 is one configured to be capable of holding one or more housed items 12 within it. Each container 11 is generally formed in a shape of a rectangular parallelepiped in the present embodiment. Thus, the container 11 has four side walls 110 each different in size from the side walls next to it.

Here, one of the two smaller side walls 110 of the four side walls 110 is referred to as the "first designated wall 111" whereas one of the two larger side walls 110 is referred to as the "second designated wall 111". And in the present embodiment, the outer surface 111a of the first designated wall 111 functions as the "first viewing surface" when the plate-shaped member 13 described below is not attached to, or otherwise placed over, the outer surface of the first designated wall 111, whereas the outer surface of the second designated wall 112 functions as the "second viewing surface 112a". The term "viewing surface" is used to mean a surface that is available for a viewing purpose and is either a physical surface that can be viewed by a person V visiting to pay respects or (as described in detail below) an imaginary surface or a transparent physical surface through which the contents of the container 11 can be viewed by a person V visiting to pay respects, when the object 1 of paying of respects is located at the support location P1 and the viewing surface faces the respects paying window 6 (as described below). In addition, a horizontal direction parallel to the outer surface 111a of the first designated wall 111 will be referred to as first horizontal direction H1 whereas a horizontal direction parallel to the second viewing surface 112a (i.e., a horizontal direction perpendicular to the first horizontal direction H1) will be referred to as second horizontal direction H2.

In the present embodiment, the container 11 has a container main body 11A and a lid 11B configured to close the opening 11Aa of the container main body 11A. Provided to the container main body 11A and the lid 11B are one or more lock mechanisms (not shown) which can fasten and unfasten the container main body 11A and the lid 11B to each other with the opening 11Aa of the container main body 11A closed by the lid 11B. In the present example, the container main body 11A has the opening 11Aa formed at the top, and is so configured that the opening 11Aa can be closed by the formed lid 11B which is formed separately from the container main body 11A. Note that the opening 11Aa may be formed in, or in place of, a side wall 110 that is not the first designated wall 111 or the second designated wall 112, for example. The container main body 11A and the lid 11B may be connected to each other through one or more members that allow relative pivoting, such as hinges.

In the present embodiment, a container window 113 for allowing a person V visiting to pay respects to view inside the container 11 is provided in the second designated wall 112. The container window 113 is formed with a container window opening 113a formed to extend from the inner surface of the second designated wall 112 to the outer surface, and a container transparent member 113b, such as a sheet of glass, which is so located to close the container window opening 113a. The container window 113 preferably occupies as great an area of the second designated wall 112 as possible. And for example, the entire second designated wall 112 may be formed as the container window 113. If such is the case, the container window 113 is considered to form the second designated wall 112. In addition, the container window 113 may be formed by only the container window opening 113a without the container transparent member 113b. If such is the case, the second designated wall 112 and the second viewing surface 112a are an imaginary wall and an imaginary surface respectively that would have been formed by a container window 113 having a container transparent member 113b if such a container window 113 was present. Therefore, if such is the case, the second viewing surface 112a is an imaginary surface through which the contents of the container 11 can be viewed by a person V visiting to pay respects when the object 1 of paying of respects is located at the support location P1 and the viewing surface faces the respects paying window 6.

On the other hand, a plate-shaped member 13 which shows information (hereafter referred to as "displayed information") related to the object 1 is attached to, or otherwise placed over, the outer surface 111a of the first designated wall 111, where a "plate-shaped member" means a member that is generally flat and thin (thickness being less than width and length). When the plate-shaped member 13 is attached to, or placed over, the outer surface 111a of the first designated wall 111, the outer surface of the plate-shaped member 13 functions as the first viewing surface. The displayed information is shown as one or more of letters, figures, symbols, or a combination of these, and is inscribed on the surface of the plate-shaped member 13 (outer surface with the plate-shaped member 13 attached to, or placed over, the outer surface 111a of the first designated wall 111) by writing, engraving, or printing or using any other known method. The displayed information may include, for example, the deceased's family name, the deceased's family crest or symbol, the deceased's favorite words or sayings, etc. In the example shown in the drawings, the displayed information is a deceased's family crest or symbol.

The plate-shaped member 13 is held by a holding portion 14 in the present embodiment. The holding portion 14 includes a pair of side holding members 141 configured to hold both end portions (along the first horizontal direction H1) of the plate-shaped member 13, and a lower holding member 142 configured to support the plate-shaped member 13 from below. The pair of side holding members 141 and the lower holding member 142 are formed integrally with the container main body 11A of the container 11, or, alternatively, fixed to the container main body 11A by fastening bolts, etc. The pair of side holding members 141 are configured to hold both end portions, along the first horizontal direction H1, of the plate-shaped member 13 such that the plate-shaped member 13 can be moved vertically while restricting movement of the plate-shaped member 13 along the first horizontal direction H1 and the second horizontal direction 112. The lower holding member 142 is configured to restrict the downward movement of the plate-shaped member 13.

In the present example, the plate-shaped member 13 is rectangular in shape that matches the shape of the outer surface 111a of the first designated wall 111. And each of the side holding members 141 of the pair has a side surface guiding portion 141a which faces the corresponding side surface of the plate-shaped member 13 and which is formed to extend along the corresponding side surface it faces, and a front surface guiding portion 141b which faces the corresponding end portion, along the first horizontal direction H1, of the front surface of the plate-shaped member 13 and which extends along the first horizontal direction H1. Further, the lower holding member 142 has a contacting portion 142a which is formed to extend along the lower end surface of the plate-shaped member 13 and which the lower end surface contacts. Therefore, the plate-shaped member 13 can be attached to, or otherwise placed over, the outer surface 111a of the first designated wall 111 by inserting the plate-shaped member 13 in the space between the pair of side holding members 141 from above. In addition, the plate-shaped member 13 held by the holding portion 14 can be removed, or moved away, from the outer surface 111a of the first designated wall 111 by moving it upward to remove it from the space between the pair of side holding members 141. Note that the pair of side holding members 141 and the lower holding member 142 may be formed integrally with one another.

In the present embodiment, each container 11 is provided with an engaged portion 142b which is configured to be engaged by an engaging portion (not shown) of the transfer device 41 of the transport system 4 (described below) when bringing the container 11 into and out of a storage location 21, etc., of a storage rack 2. In the present example, the engaged portion 142b is formed to project downward from the contacting portion 142a at a location spaced apart from the outer surface 111a of the first designated wall 111.

The storage racks 2, the respects-paying area 3, and the transport system 4 are described in detail next.

As shown in FIGS. 1 and 2, each storage rack 2 has a plurality of storage locations 21 each configured to store an object 1 of paying of respects (or simply an "object 1"). In the present embodiment, the plurality of storage locations 21 in each storage rack 2 are arranged in a plurality of vertical rows and a plurality of horizontal rows.

In the description below, a direction along which the storage locations 21 in each horizontal row are arranged will be referred to as the "rack lateral width direction X". And a horizontally direction that is perpendicular to the rack lateral width direction X will be referred to as the "rack depth direction Y". In addition, a direction along a vertical direction will be referred to as the "vertical direction Z".

In the present embodiment, an object 1 is stored in a storage location 21 such that the second horizontal direction H2 of the object 1 is parallel to the rack depth direction Y. More specifically, each storage rack 2 has a plurality of support frame members 22 each extending along the vertical direction Z, and a plurality of horizontal frame members 23 each extending along the rack depth direction Y. And each horizontal frame member 23 is fixed to two support frame members 22 that are spaced apart from each other along the rack depth direction Y. And an object 1 is supported with the object 1 placed on two horizontal frame members 23 that are spaced apart from each other along the rack lateral width direction X. In addition, in the present embodiment, two storage racks 2 are provided such that they face each other along the rack depth direction Y.

The storage facility 100 includes walls 5 that surround the pair of storage racks 2. And the objects 1 are transported, one at a time, by the transport system 4 in the area surrounded by the walls 5. The walls 5 include a partition wall 51 located in the respects-paying area 3 to partition off, or separate, a support location P1 from a respects-paying location P2 which is a location for a person V (visiting to pay respects) to pay respects. Provided in the partition wall 51 is a respects-paying window 6 configured to allow a person V (visiting to pay respects) located at the respects-paying location P2 to view (i.e., see) the object 1 at the support location P1. The respects-paying location P2 is a location used merely as a reference point (imaginary or otherwise) in the present description and may be, for example, a location spaced 1 meter from a lateral and vertical center point of the respects-paying window 6 and in a horizontal direction that is normal to the respects-paying window and points away from the support location P1. The respects-paying window 6 is located in a portion (of the partition wall 51) that is located across from the object 1 supported at the support location P1. A first reading device 64 configured to read identifying information of a person V visiting to pay respects is provided on the respects-paying location P2 side of the partition wall 51 in the respects-paying area 3. This first reading device 64 may, for example, be a card reader or the like configured to read the information on, or stored in, an item for identification, such as an ID card, owned by, or provided to, a person V visiting to pay respects. Based on the identifying information of the person V visiting to pay respects read by the first reading device 64, a supervising controller 10 (see FIG. 9) of the storage facility 100 sends instructions to a second controller 10B (see FIG. 9) to cause the second controller 10B to cause the object 1 associated with the person V (visiting to pay respects) to be transported to the support location P1 by the transport system 4. This causes the transport system 4 to transport the object 1 associated with the person V visiting to pay respects from a storage location 21 to the support location P1.

The transport system 4 is configured to transport an object 1 between the storage location 21 and the support location P1. The support location P1 is provided in the respects-paying area 3 and is a location at which an object 1 is supported, for example, when a person V (visiting to pay respects) pays respects. In other words, the support location P1 is a location in the transporting path of the object 1 that is closest to the respects-paying location P2. The transport system 4 includes a transfer device 41 and a linear transport portion 42 in the present embodiment.

The transfer device 41 is configured to transfer an object 1 to and from a storage location 21. In the present embodiment, the transfer device 41 is used to transfer an object 1 to and from a storage location 21 and also to transfer an object 1 to and from the linear transport portion 42. The transfer device 41 includes a travel rail 411 which is installed on the floor surface between the two storage racks 2 and which extends parallel to the rack lateral width direction X, a travel member 412 configured to travel while being guided by the travel rail 411, a pair of masts 413 arranged vertically on the travel member 412, a vertically movable member 414 which is configured to be moved along the vertical direction Z while being guided by the pair of masts 413, a support platform 415 which is supported by the vertically movable member 414 and which is configured to support an object 1 when such object 1 is placed thereon, and a projecting and retracting mechanism 416. The transfer device 41 may, for example, be a conventional stacker crane. The travel member 412 has an actuator (such as an electric motor) and one or more wheels which are in contact with the rail 411 and at least one of which is driven by the actuator. The vertically movable member 414 may be moved vertically by an actuator (such as an electric motor) through a cable and a pulley over which the cable is run.

The projecting and retracting mechanism 416 has an engaging portion (not shown) configured to engage the engaged portion 142b of a container 11 of an object 1, and to transfer an object 1 between the transfer device 41 and a storage location 21 by projecting or retracting at least a part of the projecting and retracting mechanism 416 along a transfer direction (rack depth direction Y) with the engaging portion engaged with the engaged portion 142b. The projecting and retracting mechanism 416 may be any conventional mechanism, and may be one that includes, for example, an actuator (such as an electric motor), a linear actuator (such as a ball screw) actuated by the actuator, and a member with the engaging portion attached thereto and coupled to and moved linearly by the linear actuator. Thus, each object 1 is stored in a storage location 21 such that the engaged portion 142b faces toward the front side where the transfer device 41 travels. In the present example, the projecting and retracting mechanism 416 is provided to the support platform 415. In addition, in the present embodiment, the transfer device 41 includes a transfer turning mechanism 431 configured to turn the support platform 415 and the projecting and retracting mechanism 416 about a shaft extending along the vertical direction Z with respect to the vertically movable member 414. Thus, the transfer device 41 is capable of changing the orientation of an object 1 to an appropriate orientation when transferring it to a storage location 21. In addition, the structure or arrangement of the transfer device 41 is not limited to the one in the example just described. Instead, the transfer device 41 may be a device that includes, for example, a fork that is used to move an object 1 while supporting it from below.

The linear transport portion 42 is configured to transport an object 1 along a path that extends linearly toward the support location P1. The linear transport portion 42 includes slide rails 421 extending along the rack depth direction Y, a slide member 422 which slides on the slide rails 421, and a pair of support members 423 which are supported by the slide member 422 and on which an object 1 is placed. Each of the support members 423 of the pair extends horizontally. And an object 1 is transferred between the transfer device 41 and the linear transport portion 42 with the direction along which the support members 423 extend being parallel to the second horizontal direction H2 of the object 1. In the present embodiment, an object 1 is transferred between the transfer device 41 and the linear transport portion 42 with the object 1 in such an orientation that the second horizontal direction H2 of the object 1 is parallel to the rack depth direction Y. The linear transport portion 42 transports an object 1 along the linear path extending parallel to the rack depth direction Y between the location at which the object 1 is transferred to and from the transfer device 41 and the support location P1.

An orientation changing device 43 is located on a transporting path of the transport system 4. The orientation changing device 43 changes the orientation of the object 1 to cause the object 1 to be in a selected orientation at the support location P1, the selected orientation being selected from a plurality of different orientations. In the present embodiment, the orientation changing device 43 includes a linear transport turning mechanism 432 configured to turn the pair of support members 423 of the linear transport portion 42 about a shaft extending along the vertical direction Z with respect to the slide member 422. In other words, the linear transport turning mechanism 432, which functions as a first turning mechanism capable of turning an object 1, is provided to the linear transport portion 42.

In the present embodiment, the object 1 is turned by the linear transport turning mechanism 432 provided to the linear transport portion 42 so that one of the first designated wall 111 and the second designated wall 112 of the container 11 of the object 1 faces toward the respects-paying location P2 side when the object 1 is at the support location P1. In other words, the object 1 is turned by the linear transport turning mechanism 432 so that one of the first viewing surface and the second viewing surface 112a of the container 11 of the object 1 faces toward the respects-paying window 6 when the object 1 is at the support location P1.

Figure 4:
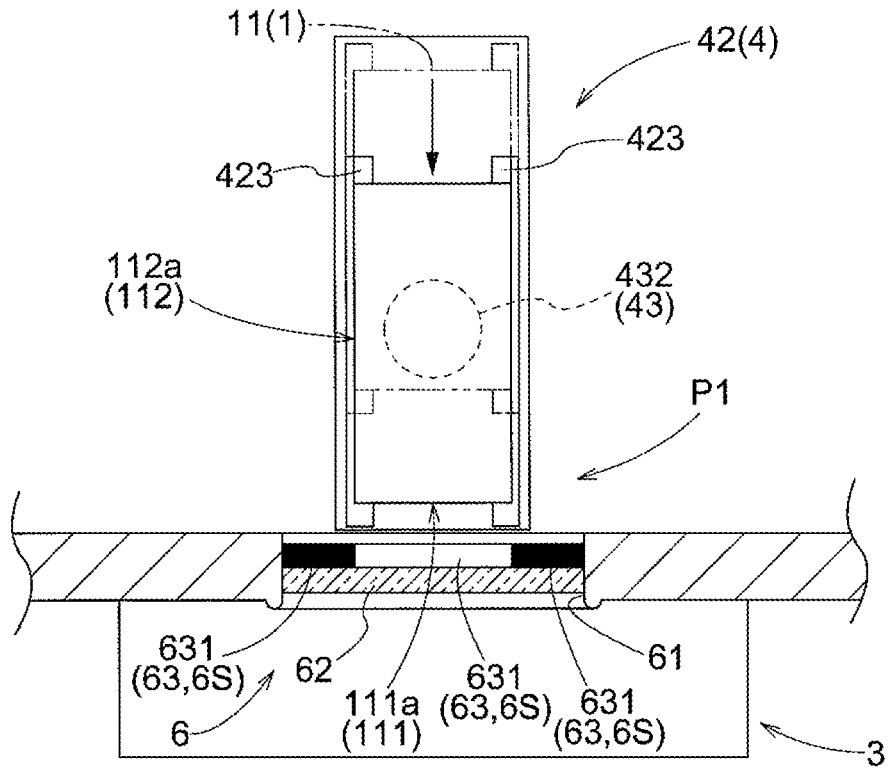
FIG. 4 is a plan view showing a first viewing surface facing toward a respects-paying location.

More specifically, as shown in FIG. 4, to cause the first viewing surface to face toward the respects-paying location P2 side at the support location P1, the object 1 is first transferred to the linear transport portion 42 by the transfer device 41 with the object 1 in such an orientation that the second horizontal direction H2 of the object 1 is parallel to the rack depth direction Y. And if the first viewing surface already faces toward the respects-paying location P2 side, the object 1 is transported to the support location P1 by the linear transport portion 42 without changing its orientation. If the first viewing surface is facing away from the respects-paying location P2 side when the object 1 is transferred to the linear transport portion 42 by the transfer device 41, then the object 1 is transported to the support location P1 after it is turned by the linear transport turning mechanism 432 to cause its first viewing surface to face the respects-paying location P2 side. This causes the first viewing surface to face toward the respects-paying window 6 when the object 1 is at the support location P1.

Figure 5:
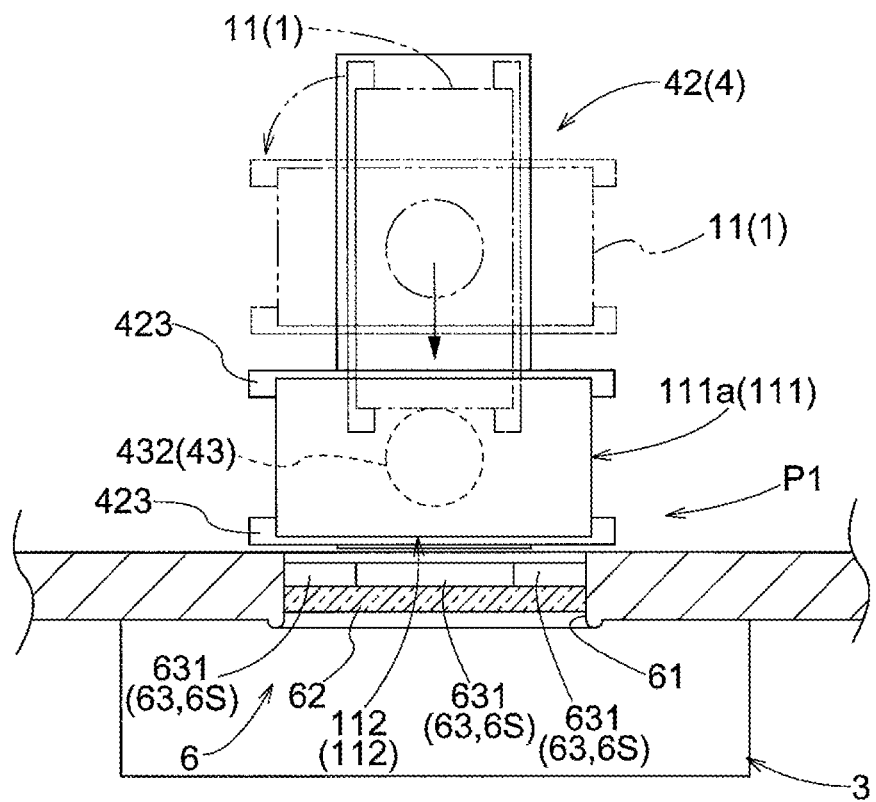
FIG. 5 is a plan view showing a second viewing surface facing toward a respects-paying location.

On the other hand, as shown in FIG. 5, to cause the second viewing surface 112a to face the respects-paying location P2 side when the object 3 is at the support location P1, the object 1 is first transferred to the linear transport portion 42 by the transfer device 41 with the object 1 in such an orientation that the second horizontal direction H2 of the object 1 is parallel to the rack depth direction Y. Next, the object 1 is rotated by the linear transport turning mechanism 432 so that the second viewing surface 112a faces the respects-paying location P2 side. And the object 1 is transported to the support location P1 by the linear transport portion 42 without changing its orientation. This causes the second viewing surface 112a to face toward the respects-paying window 6 when the object 1 is at the support location P1.

As such, in the storage facility 100, it is possible to select the orientation of the object 1 such that, when the object 1 is at the support location P1, its orientation is either one of the orientation in which the first viewing surface faces toward the respects-paying location P2 side and one in which the second viewing surface 112a faces toward the respects-paying location P2 side. In other words, it is possible for a person V (visiting to pay respects) to make a choice or selection as to whether the person V views the displayed information on the plate-shaped member 13 or the housed item or items 12 inside the container 11. As the selected orientation of the object 1, a person V visiting to pay respects selects one of (1) the orientation in which the first viewing surface faces toward the respects-paying location P2 side and (2) the orientation in which the second viewing surface 112a faces toward the respects-paying location P2 side. An arrangement may be such that it possible for a person (visiting to pay respects) to make this choice or selection in advance so that the object 1 is transported to the support location P1 such that the object is in the same orientation each time it is at the support location P1. In addition, or alternatively, the arrangement may also be such that a person V visiting to pay respects makes the choice each time the person visits so that the object 1 is transported to the support location P1 such that the object 1 is in the selected orientation at the support location P1.

In the present embodiment, the object 1 is transferred between the transfer device 41 and the linear transport portion 42 with the object 1 in such an orientation that the second horizontal direction 112 of the object 1 is parallel to the rack depth direction Y. Thus, of the two turning mechanisms (i.e., the transfer turning mechanism 431 and the linear transport turning mechanism 432) provided to the transport system 4, only the linear transport turning mechanism 432 functions as an orientation changing device 43 configured to cause one of the first viewing surface and the second viewing surface 112a to face toward the respects-paying location P2 side when the object 1 is located at the support location P1. However, the invention is not limited to such an arrangement. For example, the transfer turning mechanism 431 may function as the orientation changing device 43 instead. Such an arrangement is described below with reference to FIG. 14.

As shown in FIGS. 4 and 5, the respects-paying window 6 includes a respects-paying window opening 61 formed to extend from the inner surface of the partition wall 51 to its outer surface, and a respects-paying window transparent member 62, such as a sheet glass, provided to close the respects-paying window opening 61. The respects-paying window opening 61 is formed to be equal in size as, or to be greater in size than, that of the largest envisaged viewing surface. In the present embodiment, the respects-paying window opening 61 is formed to match the size (more specifically, a dimension or dimensions) and the shape of a second viewing surface 112a which is the largest viewing surface of the objects 1.

Figure 6:
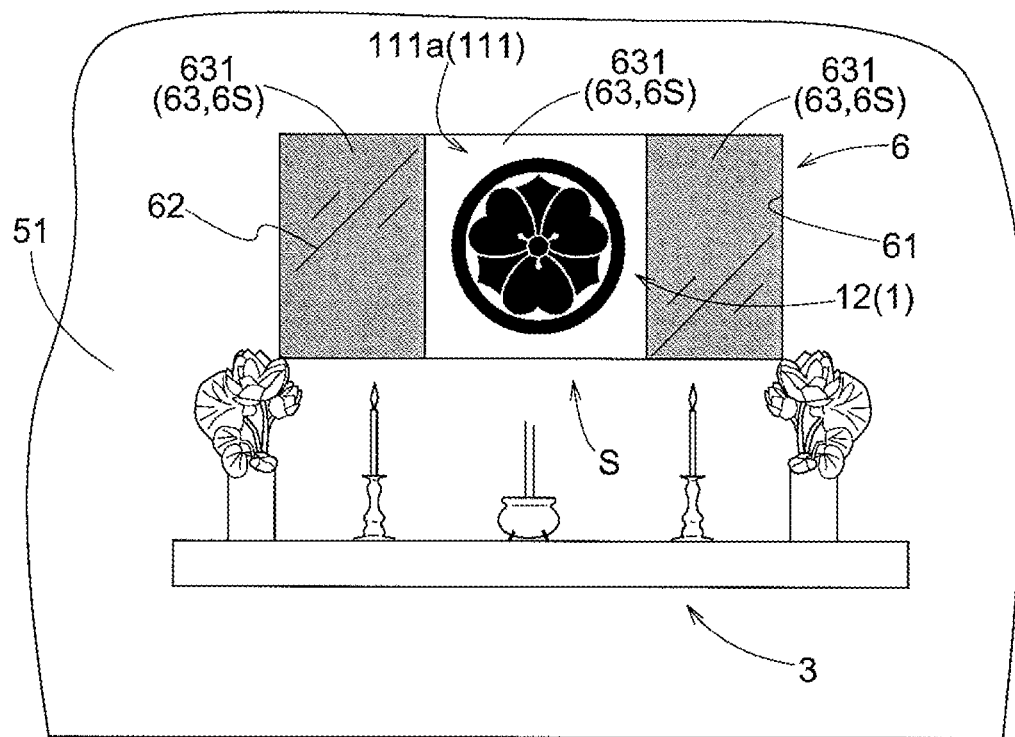
FIG. 6 is a front view showing the first viewing surface facing toward a respects-paying location.
Figure 7:
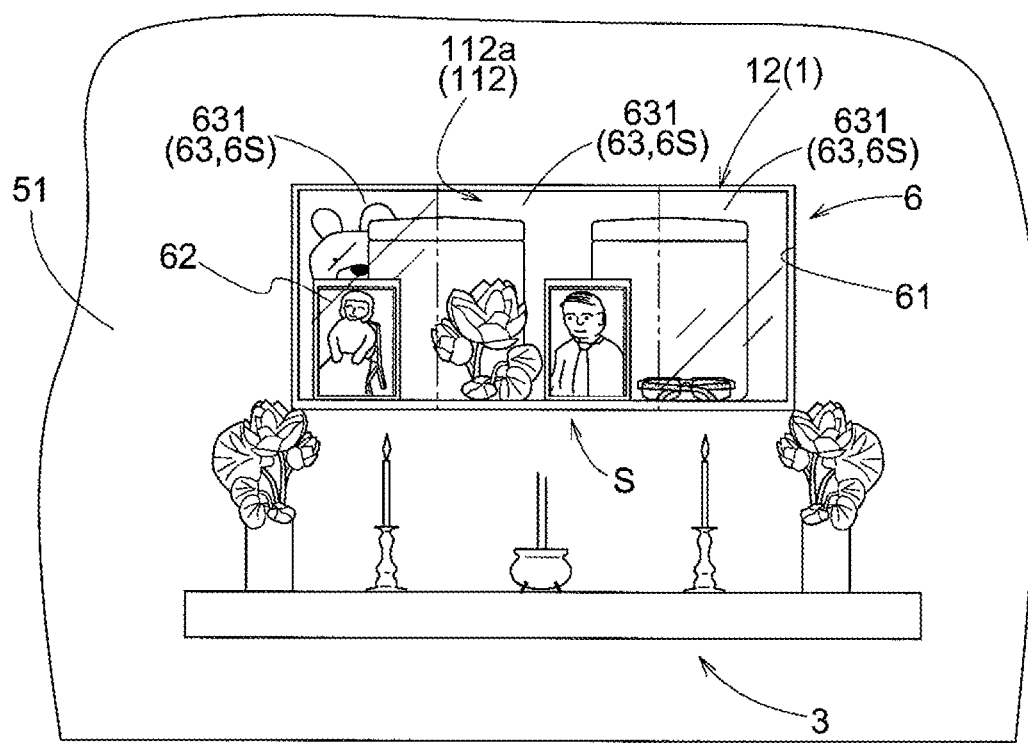
FIG. 7 is a front view showing the second viewing surface facing toward a respects-paying location.

As shown in FIGS. 6 and 7, the respects-paying window 6 is provided with an altering device 63 configured to change the size (more specifically, a dimension or dimensions) of the visually unobstructed area S depending on the size of the viewing surface (of the object 1 at the support location P1) that is selected to be viewed by a person V visiting to pay respects where the visually unobstructed area S is an area through which a person V visiting to pay respects can view or see the object 1. In the present embodiment, the altering device 63 has a plurality of (three in the present example) variable-light-transmittance members 631 each of whose light transmittance can be adjusted. The respects-paying window 6 (respects-paying window transparent member 62) is divided into a plurality of distinct areas 6S (three distinct areas 6S in the present example) and each of the plurality of distinct areas 6Sa has a variable-light-transmittance member 631 provided thereto. The word "distinct" is used to mean "non-overlapping".

In the present example, the three distinct areas 6S are arranged horizontally with one on each side of the middle distinct area 6S. And the middle area 6S is formed to have the same size and the shape as the first viewing surface. And provided to each of the three distinct areas 6S is a variable-light-transmittance member 631 so arranged to cover the entire area of the corresponding one of the plurality of distinct areas 6S, with each variable-light-transmittance member 631 generally formed in a shape of a sheet or a plate (flat and thin (thickness less than width and length)) and with each variable-light-transmittance member 631 attached to the inner surface (surface on the side of the support location P1) of the respects-paying window transparent member 62. Note that the invention is not limited to such an arrangement. For example, the arrangement may be such that the variable-light-transmittance members 631 each generally formed in a shape of a sheet or a plate are held between a pair of respects-paying window transparent members 62. Note that, among other possibilities, transmission type liquid crystal panels, for example, may be used, as the variable-light-transmittance members 631.

Figure 9:
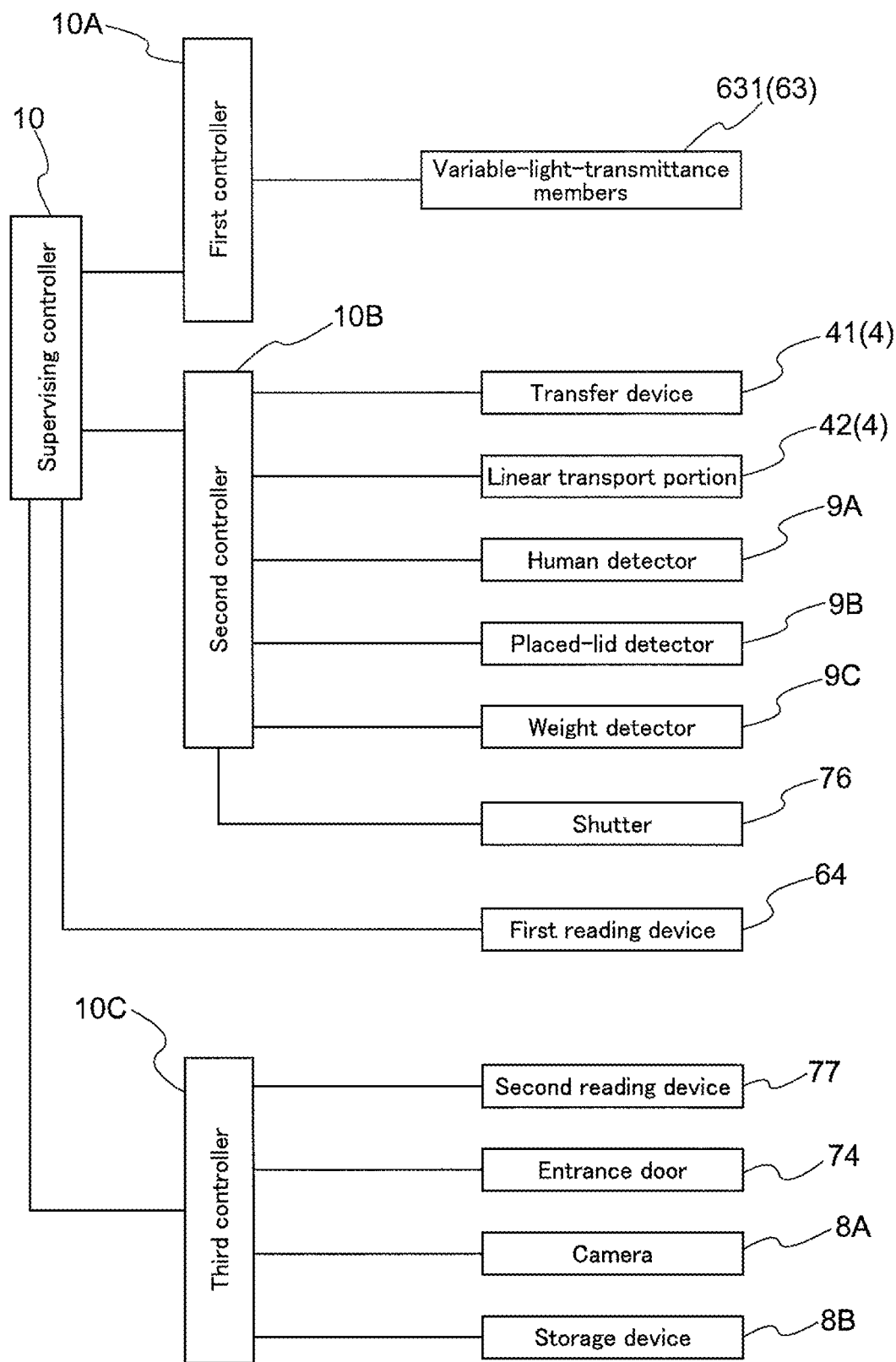
FIG. 9 is a block diagram showing control-related components.

As shown in FIG. 9, each variable-light-transmittance member 631 is connected to the first controller 10A such that it can at least receive signals (for example, electrical signals) from the first controller 10A and such that its light transmittance can be controlled by the first controller 10A. Each controller, such as the supervising controller 10, first controller 10A, the second controller 10B, and the third controller 10C described below, includes a CPU and peripheral circuitry such as memory circuitry and interface circuitry for sending and receiving signals to and/or from one or more of various components such as an actuator, sensor, input device, and other controller(s) and may be a microcomputer, with algorithms in the form of software that is stored in the memory circuitry and executable by the CPU for performing the required functions disclosed in the present specification. The first controller 10A is a part of the altering device 63. The first controller 10A is configured to control the light transmittance of the variable-light-transmittance member 631 of each distinct area 6S, depending on the size of the viewing surface (of the object 1 located at the support location P1) that is selected to be viewed by a person V visiting to pay respects (i.e., based on information about the viewing surface (of the object 1) that is selected to be viewed by a person V paying to pay respects wherein the information includes the information related to the size of the selected viewed surface). More specifically, as shown in FIGS. 4 and 6, when the viewing surface (of the object 1 at the support location P1) that is selected to be viewed by a person V visiting to pay respects is the first viewing surface, the first controller 10A controls the light transmittance of the variable-light-transmittance members 631 such that one or more among the plurality of variable-light-transmittance members 631 that face, or are located across from, the first viewing surface becomes transparent while the rest of the variable-light-transmittance members 631 do not transmit light. In the present embodiment, the first controller 10A controls the light transmittance of the variable-light-transmittance members 631 such that the one provided to the middle area 6S among the three variable-light-transmittance members 631 becomes transparent while the rest of the variable-light-transmittance members 631 do not allow light to be transmitted through them. When this happens, the area 6S in the middle becomes, or provides, the visually unobstructed area S. Note that a supervising controller 10 signally connected to the first controller 10A may determine which of the variable-light-transmittance members 631 should be made transparent based on information about the size of the viewing surface (of the object 1) that is selected to be viewed by a person V visiting to pay respects. If such is the case, the first controller 10A may be a switch that can be controlled by the supervising controller 10 and that can cause one or more of the variable-light-transmittance members 631 to become transparent.

On the other hand, as shown in FIGS. 5 and 7, when the viewed surface of the object 1 at the support location P1 that is selected to be viewed is the second viewing surface 112a, the first controller 10A controls the light transmittance of the variable-light-transmittance members 631 such that all of the variable-light-transmittance members 631 become transparent. When this happens, all areas 6S together become, or provide, the visually unobstructed area S.

Figure 8:
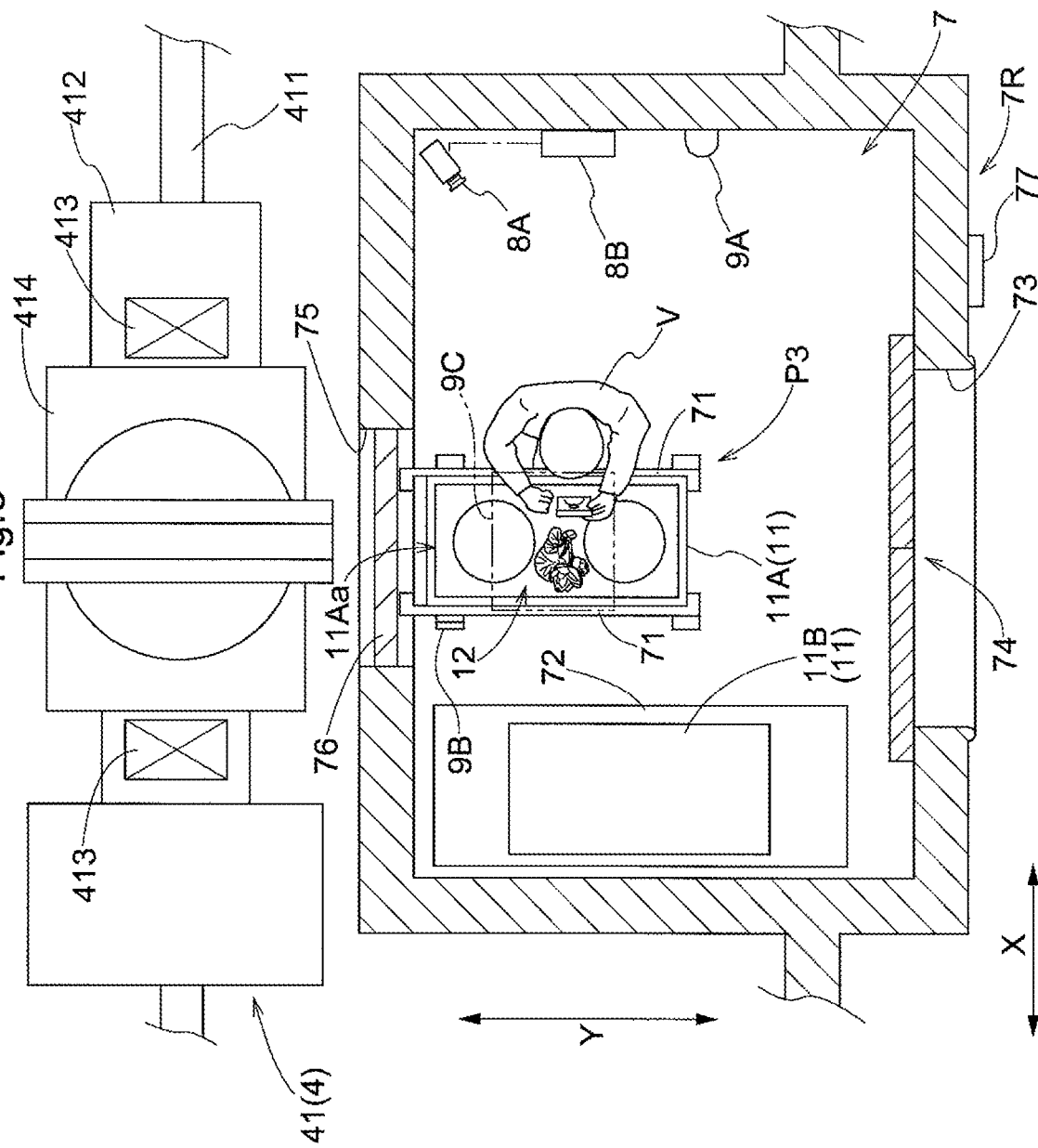
FIG. 8 is a plan view of a work area

As shown in FIGS. 1 and 8, the storage facility 100 includes a work area 7. The work area 7 is provided to allow various work to be performed on an object 1. The work area 7 is located at a location separate from the respects-paying area 3. Provided in the work area 7 is a work-purpose support location P3 at which a container 11 is supported when replacing one or more housed items 12 in a container 11 (such work is referred to hereafter simply as "replacement work").

Here, the replacement work includes work performed to place and arrange one or more items within a container 11 as housed items 12 as well as work performed to remove one or more previously housed items 12 from a container 11 and to change positions of the items within the container 11. Replacement work can be performed by a managing personnel of the storage facility 100, a person V visiting to pay respects, and/or a maintenance worker, etc.

Provided in the work area 7 are a pair of support members 71 on which an object 1 is placed ("work-purpose support members" for short), and a lid support table 72 on which the lid 11B of the container 11 of an object 1 is placed. Each of work-purpose support members 71 of the pair extends along the rack depth direction Y. And an object 1 is placed on the pair of work-purpose support members 71 with the object 1 in such an orientation that the second horizontal direction H2 of the object 1 is parallel to the rack depth direction Y. In the present embodiment, the location of an object 1 that is placed on the pair of work-purpose support member 71 is the work support location P3. And an object 1 is transported between the work-purpose support location P3 and a storage location 21 by at least a part of the transport system 4. In the present embodiment, an object 1 is transported between the work-purpose support location P3 and the storage location 21 by the transfer device 41.

When performing replacement work in the work area 7, the lid 11B is removed to expose the container opening 11Aa of the object 1 supported at the work-purpose support location P3. And replacement work is performed through the container opening 11Aa. In the present embodiment, the lid 11B removed from the container main body 11A is placed on the lid support table 72. The lid support table 72 may be fixed at a specific location or may be configured to be movable along at least one of the rack lateral width direction X, the rack depth direction Y, and the vertical direction Z. In addition, the lid support table 72 may be integrally formed with, or directly connected to, at least one of the work-purpose support members 71 of the pair.

The work area 7 is located in a work room 7R separated from the outside. The work room 7R has an entrance 73 for a person to go in and out of the work area 7, an entrance door 74 provided at the entrance 73 such that the door 74 can be opened and closed, a carry in and out opening 75 for carrying an object 1 into and out of the work area 7, and a shutter 76 provided at the carry in and out opening 75 such that the shutter 76 can be opened and closed. The carry in and out opening 75 opens to the area surrounded by the walls 5, and is so located to be across from the object 1 supported at the work-purpose support location P3. The shutter 76 is configured to open only when an object 1 is transferred between the work-purpose support location P3 and the transfer device 41. Such operation of the shutter 76 is controlled by the second controller 10B (see FIG. 9).

In addition, as shown in FIGS. 1 and 8, a second reading device 77 configured to read the identifying information of a person V visiting to pay respects is provided at a location outside the work room 7R and adjacent to the entrance door 74. This second reading device 77 may have the same structure as the first reading device 64. As such, the second reading device 77 may, for example, be a card reader or the like configured to read the information on, or stored in, an item for identification, such as an ID card, owned by, or provided to, a person V visiting to pay respects (who instead may be a managing personnel of the storage facility 100, or a maintenance worker. Same is true in the description below). As shown in FIG. 9, the second reading device 77 and the entrance door 74 are connected (through wire or wires or wirelessly) to the third controller 10C such that the second reading device 77 can at least transmit signals (for example, electrical signals) to the third controller 10C, and such that the entrance door 74 can at least receive signals from the third controller 10C. The third controller 10C transmits the identifying information of the person V visiting to pay respects read by the second reading device 77 to the supervising controller 10. Based on this identifying information, the supervising controller 10 issues a command to the second controller 10B to cause the second controller 10B to cause the object 1 associated with the person V visiting to pay respects to be transported to the work-purpose support location P3. This causes the transport system 4 to transport the object 1 associated with the person V visiting to pay respects from its storage location 21 to the work-purpose support location P3. Note that the invention is not limited to an arrangement described above where the object 1 associated with the person V visiting to pay respects is transported from a storage location 21 to the work-purpose support location P3 as a result of the person V causing the second reading device 77 to read his/her identifying information. For example, the arrangement may be such that the person V visiting to pay respects selects the transport destination for the object 1 to be one of the support location P1 and the work-purpose support location P3 after the person V causes the first reading device 64 to read his/her identifying information. In addition, or alternatively, a command to the second controller 10B to cause the second controller 10B to cause an object 1 to be transported to the work-purpose support location P3 may be sent from a reception area which may be spaced apart from the respects-paying area 3 and the work area 7.

Further, the third controller 10C determines if the identifying information of the person V (visiting to pay respects) read by the second reading device 77 is information that has been registered and is on the record, and causes the entrance door 74 to be opened and allows entrance into the work room 7R if the information is registered information. This prevents persons, other than those authorized, from entering the work area 7.

The work area 7A has a human detector 9A provided therein which is configured to detect the presence of a person in the work room 7R. The human detector 9A may be of any conventional type and may include an infrared sensor. The human detector 9A is controlled by the second controller 10B as shown in FIG. 9. The second controller 10B is connected (through wire or wires or wirelessly) to the human detector 9A, the transfer device 41, and the linear transport portion 42 such that it can at least transmit signals (for example, electrical signals) to the transfer device 41, and the linear transport portion 42 and at least receive signals from the human detector 9A. The second controller 10B controls the transfer device 41 so that the transfer device 41 does not transport an object 1 from the work-purpose support location P3 to a storage location 21, when the presence of a person is detected in the work room 7R by the human detector 9A. In other words, the object 1 is not carried out of the work area 7 by the transfer device 41 until all persons have left the work room 7R. In addition, if an object 1 is being carried into the work area 7 by the transfer device 41 when a person is about to enter the work room 7R, the second controller 10B instructs the third controller 10C through the supervising controller 10 not to allow the entrance door 74 to be opened until the object 1 is located at the work-purpose support location P3.

In addition, the second controller 10B is connected (through wire or wires or wirelessly) to a placed-lid detector 9B and a weight detector 9C such that the second controller 10B can at least receive signals (for example, electric signals) from each. The placed-lid detector 9B is provided at a location along the path along which an object 1 is transported from the work-purpose support location P3 to a storage location 21 by the transfer device 41, and is configured to detect whether a lid 11B is properly placed on the container main body 11A. If it is detected, by using the placed-lid detector 9B, that the lid 11B is not properly placed on the container main body 11A, the second controller 10B controls the transfer device 41 so that the transfer device 41 does not transport the object 1 to a storage location 21. The placed-lid detector 9B may include, for example, an image recognition device which is configured to capture an image of the object 1 in the transporting path of the object 1 with a camera (such as a digital camera and may be the camera 8A described below), and to determine whether the lid 11B is not properly positioned with respect to the container main body 11A by analyzing the image. Alternatively, the placed-lid detector 9B may include, for example, an optical sensor configured to detect, among other possibilities, the vertical position of the lid 11B with respect to the transporting surface. Note that, as shown in FIGS. 1 and 8, it is preferable that the placed-lid detector 9B is located at or near the work-purpose support location P3 in order to eliminate the possibility of a useless transporting operation.

In addition, the weight detector 9C is provided at a location along the path along which an object 1 is transported from the work-purpose support location P3 to a storage location 21 by the transfer device 41 and is configured to detect whether the weight of the object 1 is less than or equal to a weight upper limit value defined in advance. If it is detected that the weight of an object 1 is greater than the weight upper limit value, the second controller 10B controls the transfer device 41 so that the transfer device 41 does not transport the object 1 to a storage location 21. The weight detector 9C may include, for example, a weight sensor configured to measure the weight of an object 1 in its transporting path. Note that it is preferable that weight detector 9C is located at or near the work-purpose support location P3 in order to eliminate the possibility of a useless transporting operation. For example, as shown in FIGS. 1 and 8, it is preferable that a sensor, etc. which is used in the weight detector 9C is placed between the pair of the work-purpose support members 71 on the one hand and a floor surface on the other hand.

As shown in FIG. 8, the storage facility 100 includes a camera 8A and a storage device 8B in the present embodiment. As shown in FIG. 9, the camera 8A and the storage device 8B are connected (through a wire or wires or wirelessly) to the third controller 10C such that signals (for example, electrical signals) can be transmitted to and received from the third controller 10C. The camera 8A captures an image of the inside of the container 11 and is provided in the work area or at a location along the path along which an object 1 is transported from the work-purpose support location P3 to a storage location 21 by the transfer device 41. In the present example, the camera 8A is located in the work area 7. The storage device 8B stores image data obtained by the camera 8A such that the image data is associated with image-capture-time information which includes information about circumstances at the time of the capturing of the image data. As such, storage device 8B has memory circuitry (memory) and circuitry for receiving data for storage in the memory and transmitting data out of the memory.

Here, examples of information included in the image-capture-time information include, among other possibilities, time and date of the capturing of the image data by the camera 8A, identifying information of the person V visiting to pay respects who performed replacement work, etc. in the work area 7, and the full name of the person V visiting to pay respects. Here, the information obtained by the second reading device 77 when the person V visiting to pay respects entered the work room 7R is used as the identifying information, mentioned above, for the person V. Information which is associated with the identifying information of the person V visiting to pay respects and which has been stored in a data base, etc. is used for the full name, etc., of the person V. In the present embodiment, the image data captured by the camera 8A is sent to the third controller 10C, is associated with the image-capture-time information by the third controller 10C, and is stored in the storage device 8B. The image data stored in the storage device 8B can be viewed, and searched based on the image-capture-time information, using the supervising controller 10 or a terminal, such as a personal computer, which is connected to the supervising controller 10. This makes it possible to check the condition inside of a container 11 if such checking is desired later, without having to retrieve the container 11 from its storage location 21.

Figure 10:
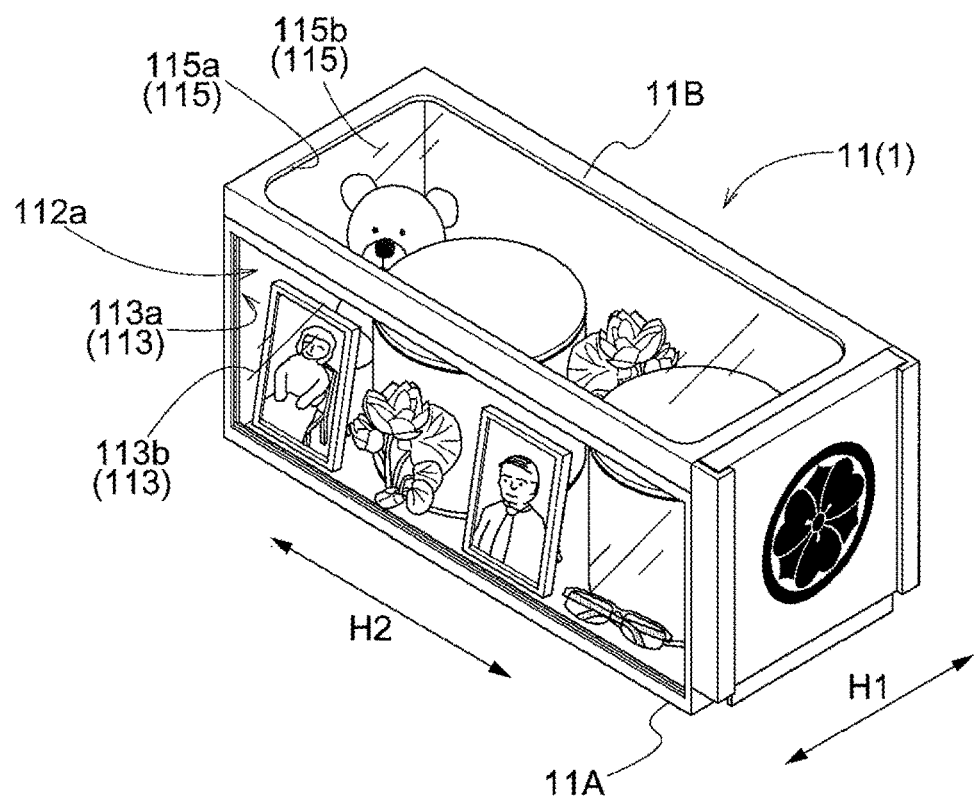
FIG. 10 is a perspective view of an object of paying of respects in accordance with another embodiment.
Figure 11:
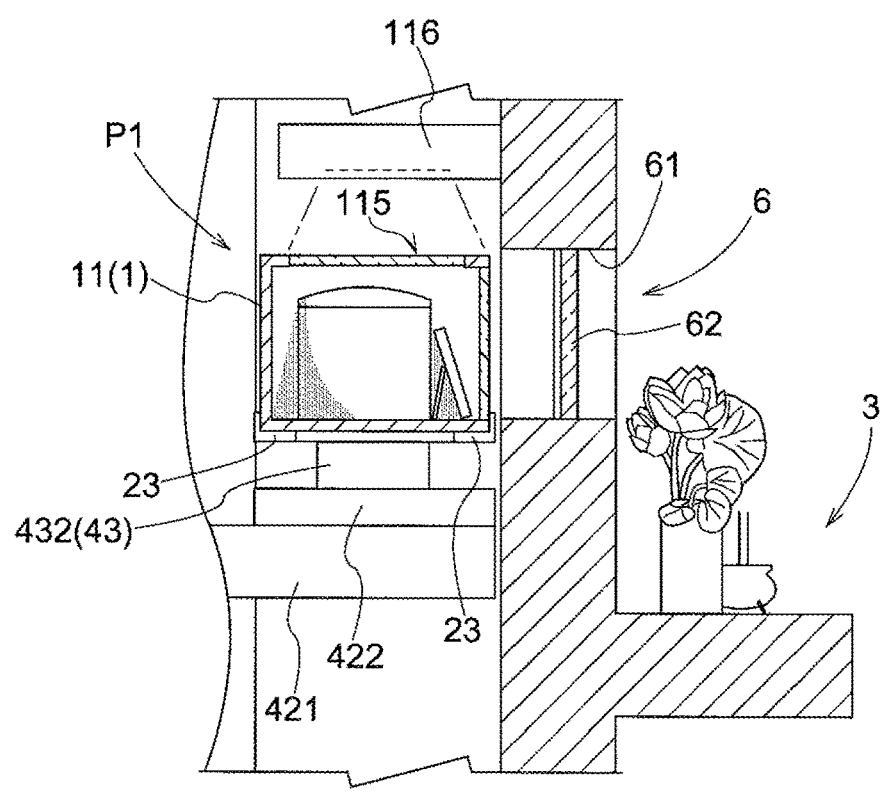
FIG. 11 is a side view showing how an object of paying of respects in accordance with the another embodiment may be used.
Figure 12:
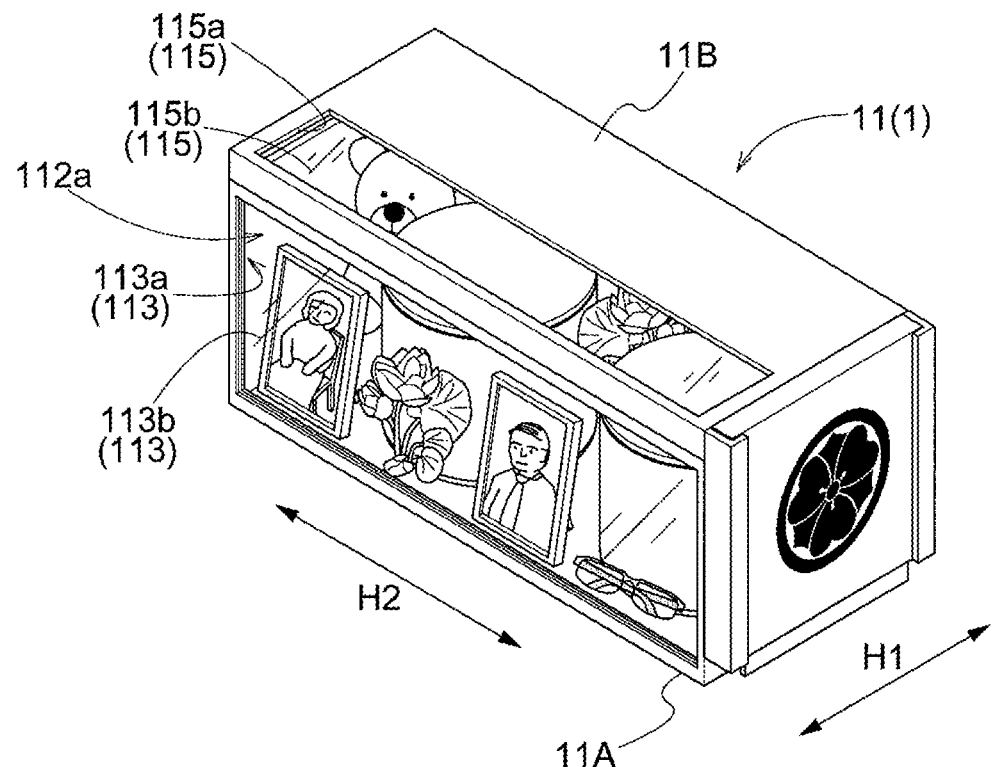
FIG. 12 is a perspective view of an object of paying of respects in accordance with yet another embodiment.
Figure 13:
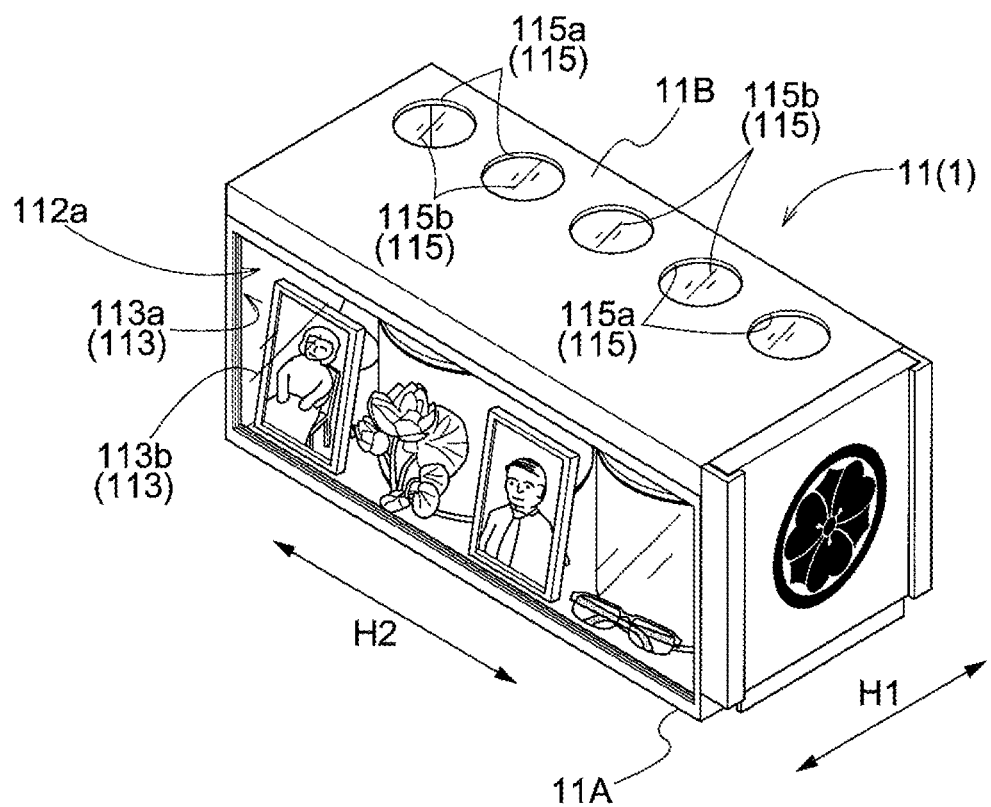
FIG. 13 is a perspective view of an object of paying of respects in accordance with yet another embodiment.

Other Embodiments (1) The structure and arrangement of the object 1 of paying of respects does not have to be limited to those described in the embodiment above. For example, the object 1 may also be one shown in FIG. 10. In the example shown in FIG. 10, an upper window 115 is provided in the top surface (lid 11B) of the container 11. The upper window 115 has, or formed with, an upper opening 115a formed to extend through the surface of the lid 11B, and an upper window transparent member 115b, such as a sheet glass, provided to close the upper opening 115a. In the example shown in FIG. 10, one rectangular upper window 115 occupies approximately the entire area of the lid 11B of the container 11. The presence of the upper window 115 allows light to enter the container 11. Thus, for example, as shown in FIG. 11, by illuminating the area inside the container 11 with an illuminating device 116 which is so installed to be located above an object 1 at the support location P1, a person V visiting to pay respects can view the housed items 12 inside the container 11 well when the second viewing surface 112a is facing toward the respects-paying location P2 side. The illuminating device 116 may be a conventional electric light source such as one or more LEDs, or fluorescent lamps. Note that, as shown in FIG. 12, one rectangular upper window 115 may be provided in an area closer to the second viewing surface 112a with respect to the center, along the first horizontal direction H1, of the lid 11B. In addition, or alternatively, as shown in FIG. 13, a plurality of circular upper windows 115 may be provided in an area on the opposite side (from the second viewing surface 112a) with respect to the center, along the first horizontal direction H1, of the lid 11B. As such, the examples described above are not limiting in terms of the number of the upper windows 115, location or locations and shape or shapes thereof. Note that only the upper opening portion 115a may be provided without the upper window transparent member 115b. Also, the arrangement may be such that the lid 11B is not provided, in which case, the opening 11Aa of the container main body 11A functions as the upper opening 115a.

Figure 14:
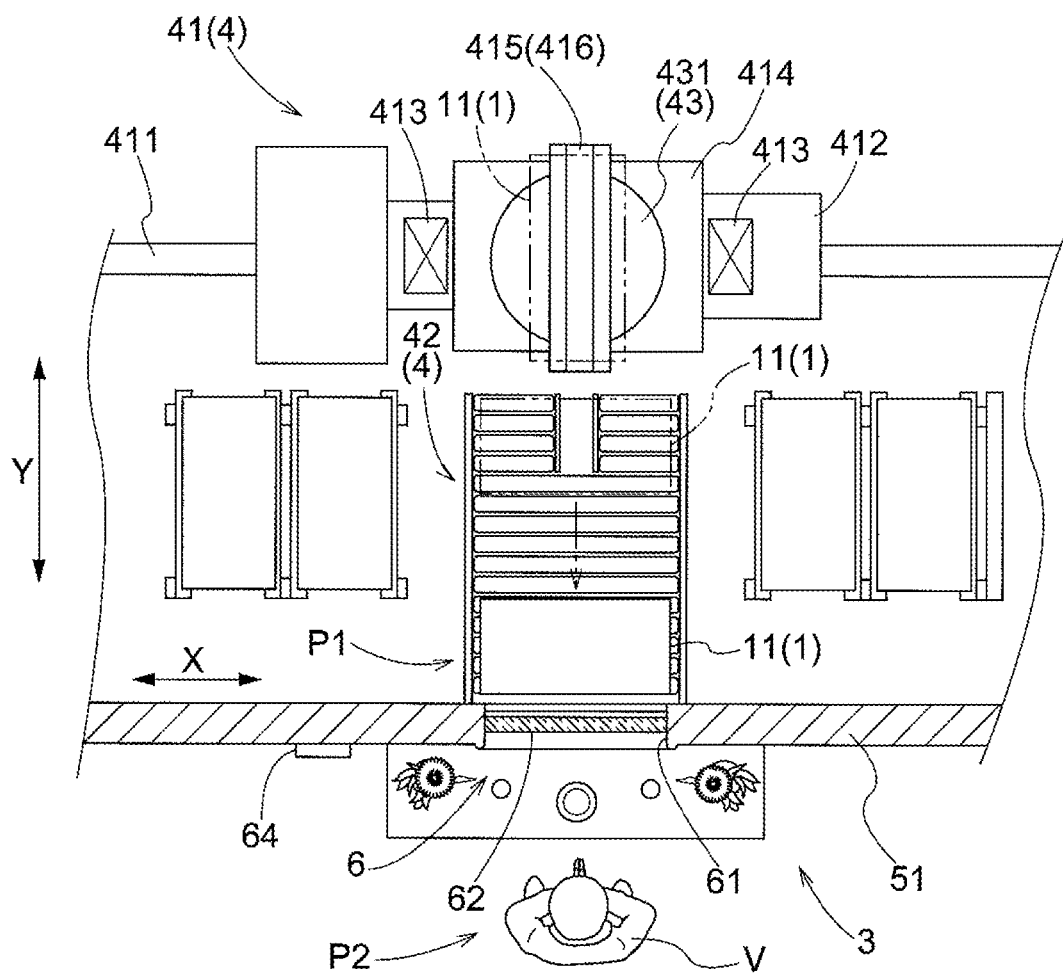
FIG. 14 is a plan view of a transport system in accordance with another embodiment.

(2) In the embodiment above, an example arrangement is described in which the linear transport turning mechanism 432 configured to turn the pair of support members 423 with respect to the slide member 422 about a shaft extending along the vertical direction Z functions as the orientation changing device 43. However, the invention is not limited to such arrangement. For example, as shown in FIG. 14, the transfer turning mechanism 431 configured to turn the support platform 415 of the transfer device 41 with respect to the vertically movable member 414 about a shaft extending along the vertical direction Z may function as the orientation changing device 43. In this case, the transfer turning mechanism 431 provided to the transfer device 41 functions as a second turning mechanism which is capable of turning the object 1. And when such arrangement is adopted, the linear transport portion 42 is preferably configured (a) to be capable of transporting an object 1 with the object 1 in such an orientation that the second horizontal direction H2 of the object 1 is parallel to the rack depth direction Y as well as in such an orientation that the first horizontal direction H1 of the object 1 is parallel to the rack depth direction Y and (b) to be capable of transferring the object 1 to and from the transfer device 41 regardless of whether the object 1 is in one or the other of the two such orientations. For example, a roller conveyor, or a belt conveyor, etc., that do not place any restriction on the orientation of the object 1 when transferring an object 1 to and from the transfer device 41 may be used as such linear transport portion 42. Note that, if the linear transport portion 42 is a roller conveyor, or a belt conveyor, etc., then the linear transport turning mechanism 432 may be located at an intermediate location along the length of the linear transport portion 42, or at an upstream end or a downstream end of the linear transport portion 42.

(3) In the embodiment above, an example arrangement is described in which the transport system 4 includes the transfer device 41 and the linear transport portion 42. However, the invention is not limited to such arrangement. For example, the arrangement may be such that the transport system 4 does not include the linear transport portion 42 and such that the transport device 41 transports an object 1 directly to the support location P1. In such arrangement, the transfer turning mechanism 431 which functions as the orientation changing device 43 is provided to the transfer device 41.

(4) In the embodiment described above, an example arrangement is described in which each of the plurality of objects 1 has the first viewing surface 111a and the second viewing surface 112a which are the two viewing surfaces. However, the invention is not limited to such an arrangement. For example, each of a plurality of objects 1 has one of a plurality of viewing surfaces of different sizes so that one object 1 has a viewing surface that is different in size from a viewing surface of another object 1. Examples of such a case include a case where the objects 1 include containers 11 (with one or more housed items 12) of different sizes and a case where the objects 1 include mortuary tablets, and/or statues of a religious figure such as Buddha, Christ, or Mary, etc., of different sizes. In such cases, the orientation changing device 43 may not be provided to the transport system 4.

Figure 15:
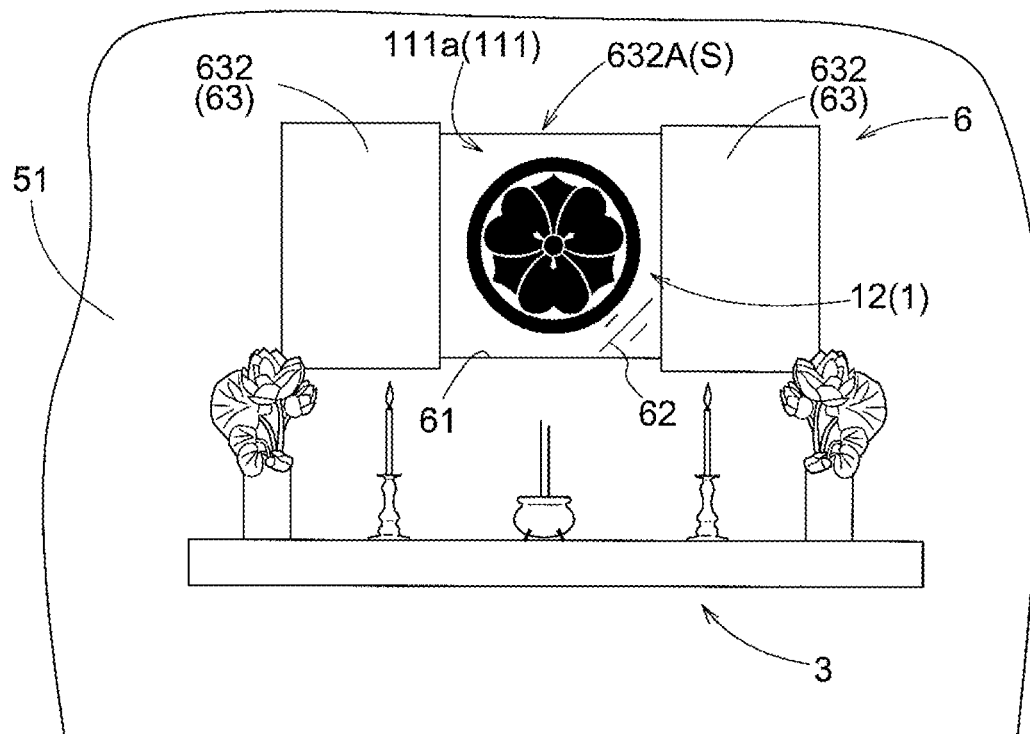
FIG. 15 is a front view of a first viewing surface facing toward a respects-paying location as seen through a respects-paying window provided with an altering device in accordance with another embodiment with, and FIG. 16 is a front view of a second viewing surface facing toward the respects-paying location as seen through the respects-paying window provided with the altering device in accordance with the another embodiment.
Figure 16:
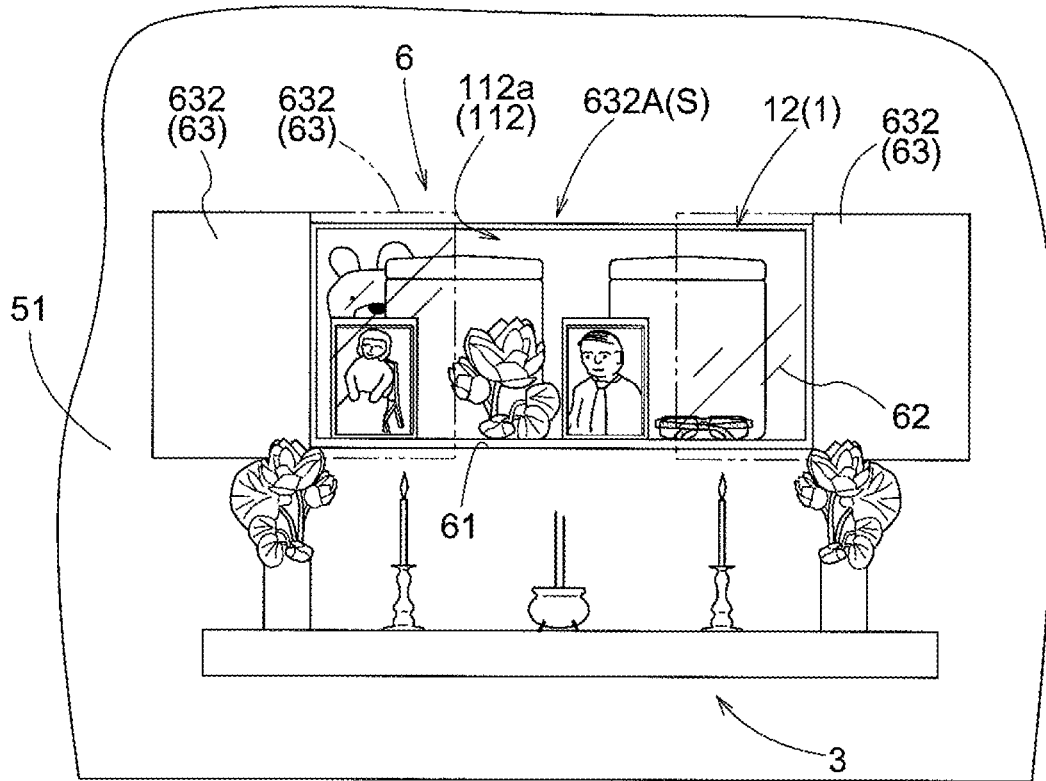

(5) In the embodiment above, an example arrangement is described in which the altering device 63 has a plurality of variable-light-transmittance members 631 and the first controller 10A. However, the invention is not limited to such arrangement. For example, as shown in FIGS. 15 and 16, instead of a plurality of variable-light-transmittance members 631, a pair of exposed-area-reducing-and-increasing members 632 which are capable of changing the size of an exposed area 632A are provided on at least one of the support location P1 side and the respects-paying location P2 side with respect to the respects-paying window 6 (respects-paying window transparent member 62) (the respects-paying location P2 side with respect to the respects-paying window transparent member 62 in the example shown in FIGS. 15 and 16). Thus, the size of the exposed area 632A defined at least in part by the pair of exposed-area-reducing-and-increasing member 632 is controlled by the first controller 10A depending on the size of the viewing surface that is selected to be viewed by a person V visiting to pay respects. Each of the exposed-area-reducing-and-increasing members 632 of the pair is a sliding door, curtain, etc., for example. In the example shown, the pair of exposed-area-reducing-and-increasing members 632 are a pair of sliding doors which are located at one and the other side locations along a horizontal direction parallel to the surface, on the respects-paying location P2 side, of the respects-paying window transparent member 62 such that the exposed-area-reducing-and-increasing members 632 are capable of being moved toward and away from each other. As shown in FIG. 15, when the viewing surface (of an object 1 at the support location P1) that is selected to be viewed by a person V visiting to pay respects is the first viewing surface, the first controller 10A causes the pair of exposed-area-reducing-and-increasing members 632 to be moved so that the portions (of the respects-paying window transparent member 62) other than the portion that is across from the first viewing surface are covered by the pair of exposed-area-reducing-and-increasing members 632. On the other hand, as shown in FIG. 16, when the viewing surface (of an object 1 at the support location P1) that is selected to be viewed by a person V visiting to pay respects is the second viewing surface 112a, the first controller 10A causes the pair of exposed-area-reducing-and-increasing members 632 to be moved so that the entire respects-paying window transparent member 62 is exposed. With such an arrangement, the exposed area 632A defined at least in part by the pair of exposed-area-reducing-and-increasing members 632 coincides with the visually unobstructed area S. Note that an arrangement may such that only one exposed-area-reducing-and-increasing member 632 is provided. In addition, it may be so arranged that one or more exposed-area-reducing-and-increasing members 632 are moved along the vertical direction Z. When such is the case, the one or more exposed-area-reducing-and-increasing members 632 may, for example, be one or more doors that are provided on at least one of the support location P1 side and the respects-paying location P2 side with respect to the respects-paying window 6 (respects-paying window transparent member 62).

(6) In the embodiment above, an example arrangement is described in which an object of paying of respects 1 comprises a container 11 and one or more housed items 12 held in the container. However, the invention is not limited to such arrangement. For example, the object 1 (of paying of respects) may be an item that is not held in a container, such as a mortuary tablet, a statue of Buddha, Christ, or Mary, or a long wooden tablet with religious inscriptions.

(7) In the embodiment above, an example arrangement is described in which the work area 7 is provided separately from the respects-paying area 3. However, the invention is not limited to such arrangement. Instead, it is possible to have a storage facility in which the work area 7 is not provided.

(8) In the embodiment above, an example arrangement is described in which a human detector 9A, a placed-lid detector 9B, and a weight detector 9C are provided. However, the invention is not limited to such arrangement. It is possible to have a storage facility in which none of the human detector 9A, the placed-lid detector 9B, and the weight detector 9C is provided. It is also possible to have a storage facility in which one or two of the human detector 9A, the placed-lid detector 9B, and the weight detector 9C is/are provided.

(9) In the embodiment above, an example arrangement is described in which a camera 8A and a storage device 8B are provided. It is possible to have a storage facility in which neither the camera 8A nor the storage device 8B is provided.

(10) Note that an arrangement disclosed in any of the embodiments described above can also be used in combination with any arrangement disclosed in any other embodiment unless inconsistency arises. Regarding any arrangements and features, the embodiments disclosed in the present description are provided for the purposes of illustration only regarding all aspects. Therefore, it is possible to make various suitable changes without departing from the spirit of the present disclosure.

Summary of Embodiments Described Above

A brief summary of the storage facility for objects of paying of respects described above is provided next.

A storage facility for objects of paying of respects comprises: a plurality of storage locations each configured to store an object of paying of respects; a respects-paying area which includes an area for a person, visiting to pay respects, to pay respects in; a transport system configured to transport an object of paying of respects between the storage location and a support location provided in the respects-paying area; a partition wall located in the respects-paying area to partition off the support location from a respects-paying location for a person visiting to pay respects, to pay respects at; and a respects-paying window provided in the partitioning wall and configured to allow a person who is visiting to pay respects and who is located at the respects-paying location to view an object of paying of respects being at the support location; wherein each object of paying of respects is provided with at least one viewing surface which is a surface selectable to be viewed through the respects-paying window, wherein a plurality of kinds of viewing surfaces are provided wherein a viewing surface of one kind being different in size from a viewing surface of another kind, and wherein the respects-paying window is provided with an altering device configured to change the size of a visually unobstructed area depending on the size of a viewing surface, of an object of paying of respects located at the support location, that is selected to be viewed, the visually unobstructed area being an area through which a person visiting to pay respects can view the object of paying of respects.

With such an arrangement, the size of the visually unobstructed area of the respects-paying window is changed depending on the size of the viewing surface (of the object of paying of respects at the support location) that is selected to be viewed. This makes it possible to keep the gap between the outer edges of the viewing surface and the outer edges of the visually unobstructed area of the respects-paying window, from becoming too large, for the size of the viewing surface that is selected to be viewed. This makes possible to properly present an object of paying of respects in the respects-paying area regardless of the size of the viewing surface that is selected to be viewed.

Here, the respects-paying window is preferably divided into a plurality of distinct areas, wherein the altering device includes variable-light-transmittance members each of which is provided to the corresponding one of the plurality of distinct areas, and each of whose light transmittance can be adjusted, and a controller configured to control light transmittance of the variable-light-transmittance members, and wherein the controller is preferably further configured to control the light transmittance of each of the variable-light-transmittance members provided to the corresponding one of the plurality of distinct areas, depending on the size of the viewing surface, of the object of paying of respects located at the support location, that is selected to be viewed.

With such an arrangement, the size of the visually unobstructed area of the respects-paying window is changed by controlling the light transmittance of each variable-light-transmittance member provided to the corresponding one of the plurality of distinct areas of the respects-paying window. Therefore, the size of the visually unobstructed area of the respects-paying window can be changed without a mechanical actuating mechanism for the respects-paying window.

In addition, the altering device preferably includes one or more exposed-area-reducing-and-increasing members capable of changing the size of an exposed area and provided on at least one of a side where the respects-paying location is located and a side where the support location is located with respect to the respects-paying window, and a controller configured to control the size of the exposed area defined at least in part by the one or more exposed-area-reducing-and-increasing members, and wherein the controller is preferably configured to control the size of the exposed area depending on the size of a viewing surface that is selected to be viewed.

With such an arrangement, the size of the visually unobstructed area of the respects-paying window is changed by moving the one or more exposed-area-reducing-and-increasing members. Therefore, movements required to change the size of the visually unobstructed area of the respects-paying window can be used, for example, to create a solemn atmosphere, etc., which can enhance the satisfaction of a person visiting to pay respects.

Also, an object of paying of respects preferably comprises a container and one or more items held in the container,
wherein the container is preferably generally formed in a shape of a rectangular parallelepiped and has a first designated wall, and a second designated wall that is different in size from the first designated wall, and
wherein it is preferable that an outer surface of the first designated wall is one of the at least one viewing surface whereas an outer surface of the second designated wall is another of the at least one viewing surface, and
wherein the transport system is preferably configured to transport a container such that one of the first designated wall and the second designated wall faces toward a respects-paying location at the support location.

With the arrangement described above, a viewing surface is generally quadrangular in shape. Therefore, the respects-paying window and the altering device can be of a relatively simple construction, making it easier to have an arrangement for properly presenting an object of paying of respects in the respects-paying area for the size of the viewing surface that is selected to be viewed by a person visiting to pay respects.

Also, a plate-shaped member which shows information related to the object of paying of respects is preferably attached to the outer surface of the first designated wall, and wherein a container window configured to allow a person, visiting to pay respects, to view inside the container is preferably provided in the second designated wall.

With such an arrangement, when the outer surface of the plate-shaped member is selected to be viewed, a person visiting to pay respects can pay respects with the plate-shaped member with information related to the object of paying of respects in view. And when the outer surface of the second viewing surface is selected to be viewed, a person visiting to pay respects can pay respects with the inside of the container visible through the container window. And in either case, the size of the visually unobstructed area of the respects-paying window is changed depending on the size of the viewing surface that is selected to be viewed by a person visiting to pay respects. Therefore, regardless of which surface is selected to be viewed, the object of paying of respects in the respects-paying area can be properly presented.

The present invention in accordance with the present disclosure can be used in a storage facility for objects of paying of respects comprising a plurality of storage locations each configured to store an object of paying of respects, a respects-paying area which includes an area for a person, visiting to pay respects, to pay respects in, a transport system configured to transport an object of paying of respects between the storage location and a support location provided in the respects-paying area.

What is claimed is:

1. A storage facility for objects of paying of respects comprising:
    a plurality of storage locations each configured to store an object of paying of respects;
    a respects-paying area which includes an area for a person, visiting to pay respects, to pay respects in;
    a transport system configured to transport an object of paying of respects between the storage location and a support location provided in the respects-paying area;
    a partition wall located in the respects-paying area to partition off the support location from a respects-paying location for a person visiting to pay respects, to pay respects at; and
    a respects-paying window provided in the partitioning wall and configured to allow a person who is visiting to pay respects and who is located at the respects-paying location to view an object of paying of respects being at the support location;
    wherein each object of paying of respects is provided with at least one viewing surface which is a surface selectable to be viewed through the respects-paying window,
    wherein a plurality of kinds of viewing surfaces are provided wherein a viewing surface of one kind being different in size from a viewing surface of another kind, and
    wherein the respects-paying window is provided with an altering device configured to change the size of a visually unobstructed area depending on the size of a viewing surface, of an object of paying of respects located at the support location, that is selected to be viewed, the visually unobstructed area being an area through which a person visiting to pay respects can view the object of paying of respects.

2. The storage facility for objects of paying of respects as defined in claim 1, wherein the respects-paying window is divided into a plurality of distinct areas,
    wherein the altering device includes variable-light-transmittance members each of which is provided to the corresponding one of the plurality of distinct areas, and each of whose light transmittance can be adjusted, and a controller configured to control light transmittance of the variable-light-transmittance members, and
    wherein the controller is further configured to control the light transmittance of each of the variable-light-transmittance members provided to the corresponding one of the plurality of distinct areas, depending on the size of the viewing surface, of the object of paying of respects located at the support location, that is selected to be viewed.

3. The storage facility for objects of paying of respects as defined in claim 1, wherein the altering device includes one or more exposed-area-reducing-and-increasing members capable of changing the size of an exposed area and provided on at least one of a side where the respects-paying location is located and a side where the support location is located with respect to the respects-paying window, and a controller configured to control the size of the exposed area defined at least in part by the one or more exposed-area-reducing-and-increasing members, and wherein the controller is configured to control the size of the exposed area depending on the size of a viewing surface that is selected to be viewed.

4. The storage facility for objects of paying of respects as defined in claim 1, wherein an object of paying of respects comprises a container and one or more items held in the container,
- wherein the container is formed in a shape of a generally rectangular parallelepiped and has a first designated wall, and a second designated wall that is different in size from the first designated wall,
- wherein an outer surface of the first designated wall is one of the at least one viewing surface whereas an outer surface of the second designated wall is another of the at least one viewing surface, and
- wherein the transport system is configured to transport a container such that one of the first designated wall and the second designated wall faces toward a respects-paying location at the support location.

5. The storage facility for objects of paying of respects as defined in claim 4, further comprising:
- a plate-shaped member showing information related to the object of paying of respects attached to the outer surface of the first designated wall, and
- wherein a container window configured to allow a person, visiting to pay respects, to view inside the container is provided in the second designated wall.

* * * * *